S. R. MUNSON.
FOOD CHOPPER.
APPLICATION FILED AUG. 14, 1906.

No. 912,482.

Patented Feb. 16, 1909.
3 SHEETS—SHEET 1.

WITNESSES:
H. J. Foote.
M. Olive Williams

INVENTOR.
Samuel R. Munson
BY Beach & Fisher
ATTORNEYS.

S. R. MUNSON.
FOOD CHOPPER.
APPLICATION FILED AUG. 14, 1906.

912,482.

Patented Feb. 16, 1909.
3 SHEETS—SHEET 2.

WITNESSES:
H. J. Foote
M. Olive Williams

INVENTOR.
Samuel R. Munson
BY
Beach & Fisher
ATTORNEYS.

S. R. MUNSON.
FOOD CHOPPER.
APPLICATION FILED AUG. 14, 1906.
912,482.
Patented Feb. 16, 1909.
3 SHEETS—SHEET 3.
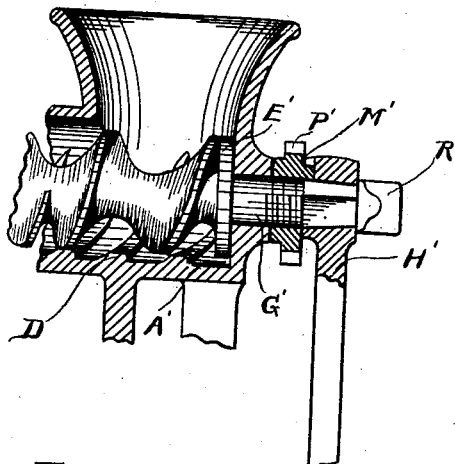
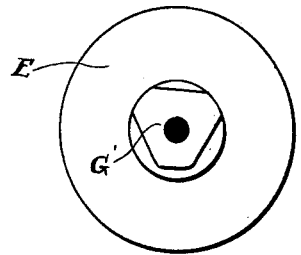
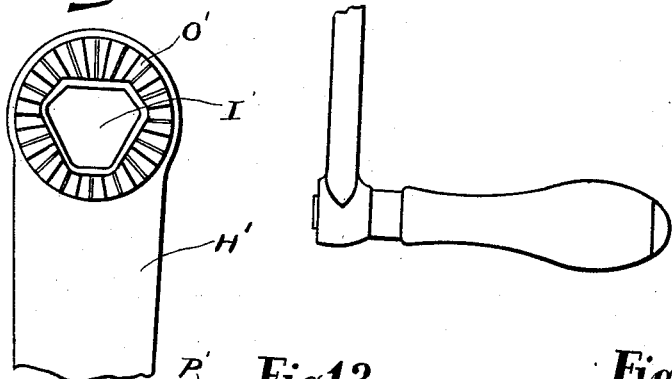
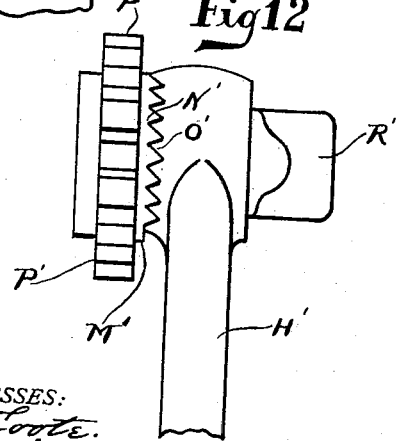
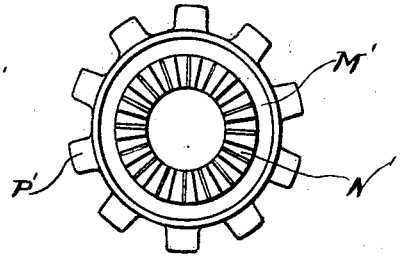
WITNESSES:
H. J. Foote.
M. Olive Williams
INVENTOR.
Samuel R. Munson
BY Beach & Fisher,
ATTORNEYS.

UNITED STATES PATENT OFFICE.

SAMUEL R. MUNSON, OF NEW HAVEN, CONNECTICUT, ASSIGNOR TO SARGENT & COMPANY, OF NEW HAVEN, CONNECTICUT, A CORPORATION OF CONNECTICUT.

FOOD-CHOPPER.

No. 912,482.   Specification of Letters Patent.   Patented Feb. 16, 1909.

Application filed August 14, 1906. Serial No. 330,534.

*To all whom it may concern:*

Be it known that I, SAMUEL R. MUNSON, of the city and county of New Haven and State of Connecticut, have invented new and useful Improvements in Food-Choppers, of which the following is a full, clear, and exact description.

This invention relates to food choppers, and has for its object the production of a food chopper embodying the various improvements and combinations of parts set forth and claimed hereinafter.

The invention is illustrated in the accompanying drawings, in which—

Figure 1:
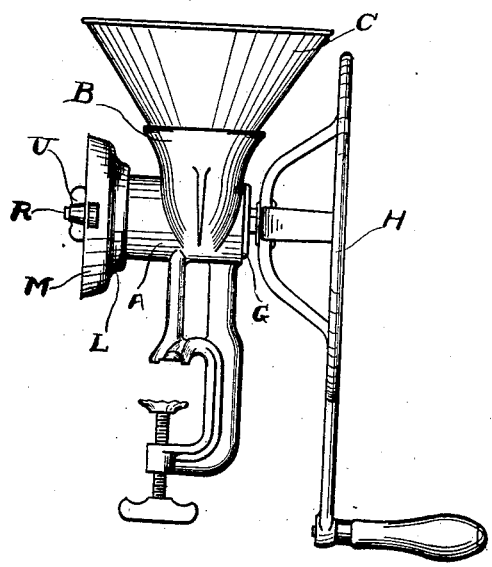
Figure 5:
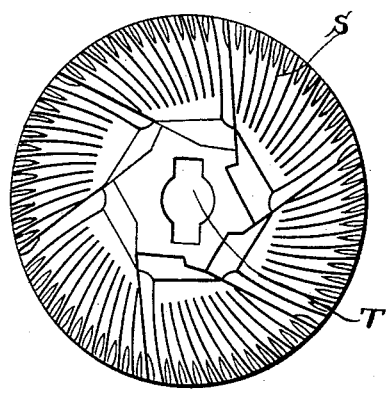
Figure 2:
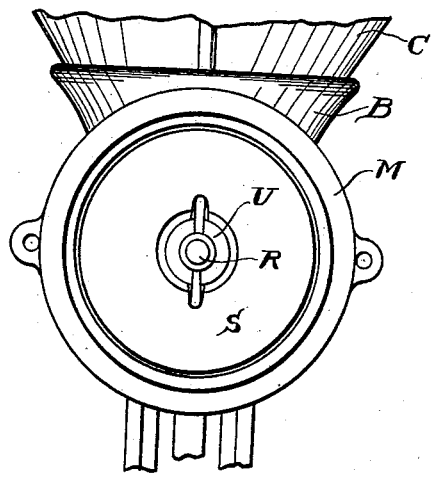
Figure 6:
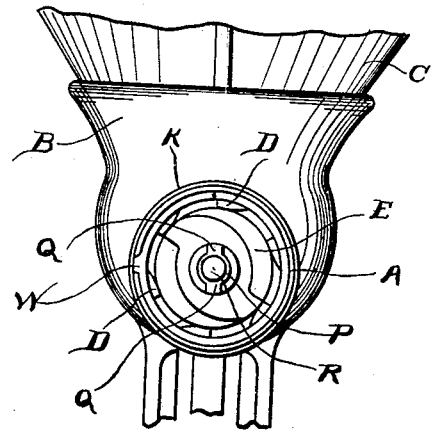
Figure 3:
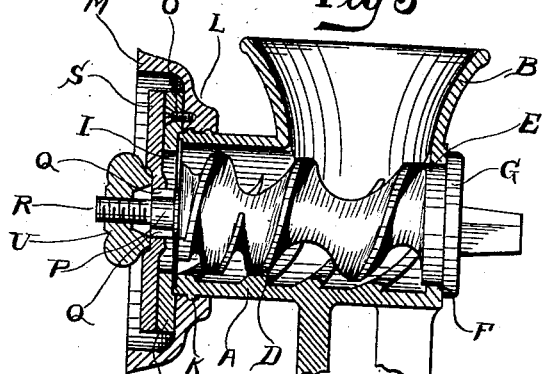
Figure 7:
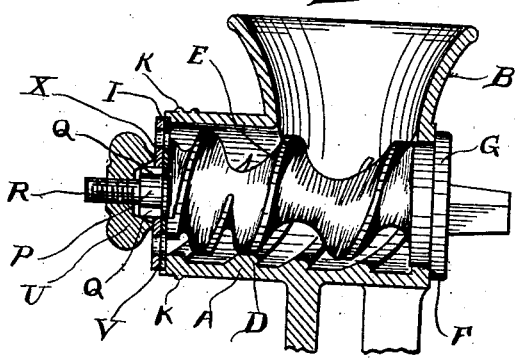
Figure 4:
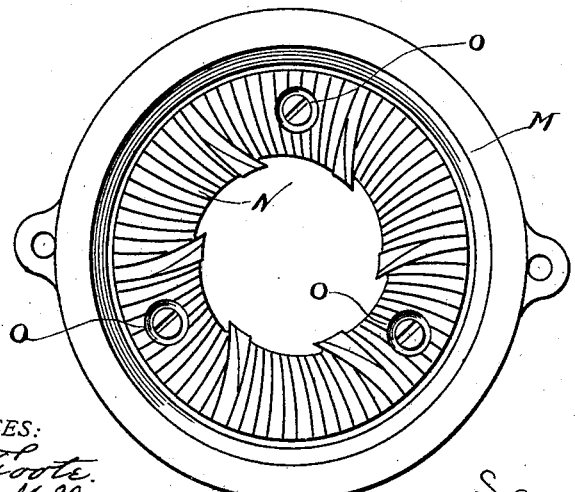

Figure 1 represents a side elevation of a chopper embodying the invention, and having the grinding plates in place, Fig. 2, a front view of the same, Fig. 3, a central longitudinal vertical section through the same, Fig. 4, a detailed front view of the stationary grinding plate adapted to be secured to the casing of the chopper, Fig. 5, an inside rear view of the rotary grinding plate, Fig. 6, a front view of the casing of the chopper with the grinding plates removed, Fig. 7, a central longitudinal vertical section through the chopper with the ordinary cutting plates in place, Fig. 8, a central longitudinal vertical section through the rear of the chopper showing a modified connection with the handle, Fig. 9, an end view of the rotary feed screw, Fig. 10, a rear end view of the clutch, Fig. 11, a front view of the upper end of the handle, and Fig. 12, a side elevation in detail of the clutch and handle showing their engaging parts.

In all figures, similar letters of reference represent like parts.

Referring to the drawings for a more particular description, the parts designated by the letter A represent the casing of the chopper, and B the hopper in which the maize, or other material to be chopped or ground is inserted.

C designates a funnel applied to the mouth of the hopper B.

The interior of the casing A is provided with internal ribs D of well known construction, and a forcing screw E is inserted through the rear opening F in the casing, in which it has suitable bearings.

A flange G on the rear of the forcing screw limits the forward movement of the same, and a handle H of any desired construction may be secured to the screw to rotate the same.

The forward end of the casing A is provided with a circular opening I, and on the outer surface of the casing round the opening I is screw threading K for the ring L, having a forwarding projecting circular flange M. A grinding disk N is secured to the ring L by means of screws O, or other well known means (Figs. 3 and 4). Through the opening I of the casing projects an extension P of the forcing screw E. On the extension P are lateral wings Q, and from the projection P extends a screw threaded post R. An outside grinding disk S is provided with an axial perforation T corresponding with the projection P and wings Q, so that when the disk S is mounted on the projection P it will necessarily rotate with the forcing screw E. A wing nut U is adapted to screw on the post R and clamp the disk S in place. The disk S is slightly less in diameter than the circular flange M of the ring L, so that the meal when ground between the two disks N and S will pass out beyond the periphery of the outer grinding disk S.

When the chopper is to be used in the process of chopping meats, or other substances, the disk S is removed from the projection P and the ring L and disk N are unscrewed from the casing A. A cutting plate V (Fig. 7) is then placed at the end of the casing A, which may have a lateral offset, or other device, to take into a slot W on the end of the casing to prevent the rotation of the cutter V, in well known manner. An outer cutting plate X is thereupon mounted upon the projection P and wings Q to rotate with the forcing screw E, and the plate will be held in place by the wing nut U. As these cutting plates may be of any well known construction, a detailed description is herein omitted.

In the modified form shown in Figs. 8–10, the rear end of the forcing screw E′ has its bearing in the rear of the casing A′ by means of a shaft G′, which, as shown more particularly in Fig. 8, is screw threaded through a portion of its length, and as more particularly shown in Figs. 8 and 9 is flattened in a portion of its length to project into and engage an annular opening I′ in the handle H′. A clutch M′ is provided with an axial perforation screw threaded to screw on to the shaft G', and is provided at its rear with serrations or teeth N' adapted to engage similar teeth O' on the forward surface of the upper end of the handle. The clutch M' is also provided with projections P' for the hand of the operator. By this construction, the clutch M' may be screwed on to the shaft G' and the handle slipped on the shaft with which it is adapted to rotate, but the teeth O' of the handle and N' of the clutch are adapted to engage each other to prevent independent rotation, so that the clutch M' may be screwed up against the rear of the casing A' so as to allow for the proper adjustment of the forcing screw E' within the casing, whereupon by slipping the handle on to the shaft G' so that the teeth O' engage the teeth N', the clutch is prevented from any rotary movement independent of the forcing screw. A thumb nut R' may engage the end of the shaft G' to limit the movement of the handle H'.

Having now described my invention, what I claim and desire to secure by Letters Patent, is:—

1. In a food chopper, or similar instrumentality, the combination with a cylindrical casing; of a rotary forcing screw therein; a ring adapted to be screwed on the forward end of said casing, provided with a circular flange; an inner grinding disk removably secured to said ring within said flange; and an outer grinding disk adapted to be mounted on said forcing screw to rotate therewith, the diameter of said outer grinding disk being less than that of the flange of said ring, whereby the material acted upon by said grinding disks will pass between the periphery of said outer grinding disk and the flange of said ring, substantially as described.

2. In a food chopper, or similar instrumentality, the combination with a cylindrical casing; of a rotary forcing screw therein having a rearwardly projecting shaft; a clutch adapted to be screwed on said shaft and bear against the casing; a handle adapted to slide on said shaft with which it is adapted to rotate; engaging mechanism between said clutch and handle; and means for limiting the longitudinal movement of said handle on said shaft, substantially as described.

In witness whereof I have hereunto set my hand on the 7th day of August, 1906.

SAMUEL R. MUNSON.

Witnesses:
JOHN H. SHAW,
LOUISE M. READY.